United States Patent [19]

Fox

[11] 4,351,911

[45] Sep. 28, 1982

[54] FOAMABLE POLYESTER COMPOSITION

[75] Inventor: Daniel W. Fox, Pittsfield, Mass.

[73] Assignee: General Electric Company, Pittsfield, Mass.

[21] Appl. No.: 174,604

[22] Filed: Aug. 1, 1980

Related U.S. Application Data

[63] Continuation of Ser. No. 78,379, Sep. 24, 1979, abandoned, which is a continuation of Ser. No. 897,145, Apr. 17, 1978, abandoned, which is a continuation of Ser. No. 486,212, Jul. 5, 1974, abandoned, which is a continuation-in-part of Ser. No. 375,770, Jul. 2, 1973, abandoned.

[51] Int. Cl.³ .............................................. C08L 67/00
[52] U.S. Cl. ....................................... 521/138; 521/74;
521/75; 521/79; 521/89; 521/90; 521/93;
521/94; 521/95; 521/182; 521/189
[58] Field of Search ............... 521/89, 138, 182, 74,
521/75, 79, 90, 93, 94, 95, 189; 260/40 R;
264/DIG. 17; 525/444

[56] References Cited

U.S. PATENT DOCUMENTS

| | | | |
|---|---|---|---|
| 3,211,678 | 10/1965 | Robinson | 521/95 |
| 3,227,665 | 1/1966 | Fourcade et al. | 521/85 |
| 3,227,784 | 1/1966 | Blades et al. | 521/85 |
| 3,230,184 | 1/1966 | Alford | 521/85 |
| 3,232,893 | 2/1966 | Salgado et al. | 521/85 |
| 3,260,688 | 7/1966 | Watanabe et al. | 521/85 |
| 3,344,221 | 9/1967 | Moody et al. | 521/85 |
| 3,389,446 | 6/1968 | Parrish | 521/85 |
| 3,474,048 | 10/1969 | Chappeleur et al. | 521/60 |
| 3,671,487 | 6/1972 | Abolins | 260/40 R |
| 3,725,321 | 4/1973 | Wirth et al. | 521/85 |
| 3,953,394 | 4/1976 | Fox | 525/444 |
| 4,280,005 | 7/1981 | Fox | 521/90 |

OTHER PUBLICATIONS

Bennett et al., Reinforcement of Foam Rubber, "Rubber World", Sep. 1950, pp. 672, 673 & 710.

Primary Examiner—J. Ziegler
Attorney, Agent, or Firm—Hedman, Casella, Gibson & Costigan

[57]      ABSTRACT

A foamable thermoplastic injection moldable composition comprising in admixture (a) a polyester resin, (b) a filler selected from the group consisting of fibrous glass or a mineral or mixtures thereof in an amount of from about 5 to about 50 weight percent, and (c) a minor amount of foaming agent.

13 Claims, No Drawings

FOAMABLE POLYESTER COMPOSITION

CROSS-REFERENCE TO RELATED APPLICATIONS

This is a continuation of application Ser. No. 78,379, filed Sept. 24, 1979, abandoned, which is a continuation of application Ser. No. 897,145, filed Apr. 17, 1978, abandoned, which is a continuation of application Ser. No. 486,212, filed July 5, 1974, abandoned, which, in turn, is a continuation-in-part of Ser. No. 375,770, filed July 2, 1973, also now abandoned.

This invention relates to a foamable thermoplastic injection moldable composition comprising in admixture (a) a polyester resin, (b) a filled selected from the group consisting of fibrous glass and a mineral or mixtures thereof in an amount of from about 5 to 50 weight percent, and (c) a minor amount of foaming agent.

BACKGROUND OF THE INVENTION

High molecular weight linear polyesters and copolyesters of glycols and terephthalic or isophthalic acid have been available for a number of years. These are described inter alia in Whinfield et al., U.S. Pat. Nos. 2,465,319 and in Pengilly, 3,047,539. These patents disclose that the polyesters are particularly advantageous as film and fiber formers.

From U.S. Pat. Nos. 3,304,282; 3,396,142; 3,408,225; 3,437,632; 3,671,487 and 3,678,079, it is known to prepare glass fiber reinforced thermoplastics.

Also, it is known to add a foaming agent to thermoplastics as disclosed in U.S. Pat. Nos. 2,964,794; 3,268,636; 3,277,209; 3,290,261; 3,377,296; 3,436,446; 3,442,829 and British Pat. No. 838,824. However, none of these references discloses a composition comprising a polyester, a foaming agent and a filler selected from the group consisting of fibrous glass and a mineral or mixtures thereof, which can be foam molded.

It has been discovered that the instant injection moldable composition comprising in admixture: (a) a polyester resin, (b) a filler selected from the group consisting of fibrous glass or a mineral or mixtures thereof in an amount of from about 5 to about 50 weight percent; and (c) a minor amount of a foaming agent, provides polyester products which have uniform cell structure, smooth surfaces, high impact, modulus and tensile strength.

When a foaming agent is added directly to a polyester, highly irregular foaming occurs which results in an inferior product in that the product contains voids, sink marks. The product is also warped. However, when the foaming agent is added to a polyester containing a filler such as fibrous glass or a mineral or mixtures thereof in an amount of at least 5 weight percent, a foamed product is produced having a rigid cellular core within a solid integral skin.

The composition of the instant invention is injection molded in a standard injection molding machine to produce a variety of foam molded products.

DESCRIPTION OF THE INVENTION

This invention is directed to a foamable thermoplastic injection moldable composition comprising in admixture: (a) a polyester resin selected from the group consisting of (1) a poly(ethylene terephthalate) resin or a copolyester thereof, (2) a combination of a poly(ethylene terephthalate) resin and a poly(1,4-butylene terephthalate) resin or copolyesters thereof and (3) a combination of a poly(1,4-butylene terephthalate) resin or a copolyester thereof and a linear aliphatic polyester resin; (b) a filler selected from the group consisting of fibrous glass or a mineral or mixtures thereof in an amount of from about 5 to about 50 weight percent; and (c) a minor amount of a foaming agent.

A preferred feature of this invention is to provide a foamable thermoplastic injection moldable composition comprising in admixture; (a) a polyester resin selected from the group consisting of (1) a poly(ethylene terephthalate) resin or a copolyester thereof, (2) a combination of a poly(ethylene terephthalate) resin and a poly(1,4-butylene terephthalate) resin or copolyester thereof and (3) a combination of a poly(1,4-butylene terephthalate) resin or a copolyester thereof and a linear aliphatic polyester resin; said copolyester formed with a minor amount of an aliphatic or aromatic dicarboxylic acid or an aliphatic polyol; (b) a filler selected from the group consisting of fibrous glass or a mineral or mixtures thereof in an amount of from about 5 to about 50 weight percent; and (c) a foaming agent in an amount of from about 0.02 to about 2.0 weight percent, said weight percent being based on the total weight of resin.

The poly(ethylene terephthalate) resin of the instant invention is disclosed in Whinfield et al., U.S. Pat. No. 2,465,319. Such polymeric linear terephthalic esters are composed of recurring structural units of the formula

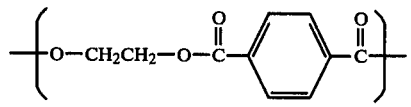

Such polyesters will have molecular weights high enough to have melting points above 200° C. Poly(ethylene terephthalate) resins can be made following the teachings of the Whinfield et al. and Pengilly patents above-mentioned, incorporated herein by reference, and are available from a number of sources.

The poly(butylene terephthalate) resin of the instant invention has repeating units of the general formula

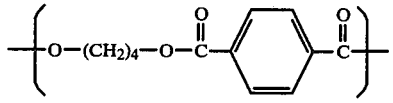

Also contemplated are mixtures of the above esters with minor amounts, e.g., from 0.5 to 2% by weight, of units derived from aliphatic or aromatic dicarboxylic acids and/or aliphatic polyols, e.g., glycols, i.e., copolyesters. These can also be made following the teachings of the Pengilly and Whinfield et al. patents, above-mentioned, suitably, modified, if necessary.

Among the units which can be present in the copolyesters are those derived from aliphatic dicarboxylic acids, e.g., of up to about 50 carbon atoms, including cycloaliphatic, straight and branched chain acids, such as adipic acid, cyclohexanediacetic acid, dimerized $C_{16}$-$C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acid and the like. In addition to the 1,4-butylene glycol units, there can also be minor amounts of units derived from other aliphatic glycols and polyols, e.g., of up to about 50 carbon atoms, including glycerol, cyclohexanediol, and the like. Also included are the units derived from HO―(CH₂CH₂O)ₙH wherein n is 7 to about 50. Such copolyesters can be made by techniques well known to those skilled in the art.

Illustratively, sufficiently high molecular weight polyesters of both types, i.e., from poly(ethylene terephthalate) and poly(1,4-butylene terephthalate) will have an intrinsic viscosity of at least 0.2 and preferably about 0.4 deciliters/gram as measured in o-chlorophenol, a 60/40 phenol tetrachloroethane mixture or a similar solvent at 25°-30° C. The upper limit is not critical, but it will generally be about 2.5 dl./g. Especially preferred polyesters will have an intrinsic viscosity in the range of 0.5 to 1.3.

Poly(ethylene terephthalate) resins and poly(1,4-butylene terephthalate) and/or copolyester resins are combinable with each other in all proportions. Consequently, alloyed combinations comprising from 1 to 99 parts by weight of poly(ethylene terephthalate) and from 99 to 1 part by weight of poly(1,4-butylene terephthalate) resin are included within the scope of the invention. In general, however, compositions containing from about 10 to about 90, and especially from about 20 to about 80, parts by weight of poly(ethylene terephthalate) and from about 90 to about 10, and especially from about 80 to about 20, parts by weight of poly(1,4-butylene terephthalate) resins exhibit the best overall combination of properties and these concentrations are preferred.

Poly(1,4-butylene terephthalate) resin and/or copolyester resins are combinable with a linear aliphatic resin.

The linear aliphatic resins may be of the family having repeating units of the general formula

―(O―R―CO)― wherein R is divalent alkylene of, e.g., from 2 to 30 carbon atoms, straight chain and branched, and the number of repeating units is such that the average molecular weight is up to about 100,000.

Linear aliphatic polyesters which may be included are derived from aliphatic dibasic acids of the general formula HOOC―(CH₂)ₙCOOH wherein n is from about 4 to about 10 and aliphatic glycols of the formula HO―(CH₂)ₙOH wherein n is from about 2 to about 10.

This polyester component may also be of the general formula

―(O―(CR¹R²)ₘCO)ₙ― wherein R¹ and R² are hydrogen or alkyl, e.g., methyl or ethyl, m is, for example, 2-5, and n is from about 25 to about 1500. Especially preferred compounds within this family will comprise those in which R¹ and R² are each hydrogen, or are methyl or ethyl on the carbon adjacent to the linking oxygen atom. The most preferred such polyesters are poly(beta-propiolactone), poly(gamma-butyrolactone), poly(delta-valerolactone), poly(epsilon-caprolactone) or mixtures of at least two of them. The best balance of properties appears to result from the use of poly(epsilon-caprolactone) and this is preferred.

This polyester resin component can be made in known ways. For example, by polymerizing the corresponding lactone:

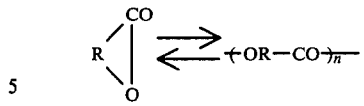

where R and n are as above defined. The reaction can be spontaneous or will proceed on heating, depending on the lactone, but it is best to use a catalyst or an initiator, e.g., cationic or anionic, organic tertiary bases, alkali and alkaline earth metals, hydrides, alkoxides, alkyls, a coordination compound, or a hydrogen donor, e.g., a carboxylic acid, alcohol, glycol, primary and secondary amine or an alkanol amine. Depending on the lactone, polymerization will occur at −20° to 200° C., in bulk or with melts or solutions of the monomer in an inert solvent. It is preferred to use well dried materials and highest molecular weights are obtained with carefully purified monomers, e.g., those distilled from isocyanates.

By way of illustration, epsilon-caprolactone, after purification by distillation from 2% toluene diisocyanate, is treated with 0.001 mole of acetyl perchlorate/mole of monomer and polymerizes in 68 hours to a 60% yield of high molecular weight poly(epsilon-caprolactone), intrinsic viscosity about 1.02 dl./g. (in benzene at 20° C., 10 g./l.). With an anionic initiator, aluminum triethyl, 0.01 mole/mole of monomer, purified epsilon-caprolactone polymerizes in 21 hours to a 72.5% yield of polymer, intrinsic viscosity, 0.675 dl./g. (in benzene at 20° C., 10 g./l.). Instead of acetyl perchlorate, other cationic initiators can comprise trifluoroacetic acid and trifluoroacetic anhydride/AlCl₃ (1:2). Instead of aluminum triethyl, other anionic initiators which can be used comprise metallic sodium, sodiumnaphthalene, and the like.

Entirely analogous procedures can be used to polymerize the corresponding other lactones: beta-propiolactone, gamma-butyrolactone and delta-valerolactone.

Two other useful methods comprise heating a mixture of 675 parts of epsilon-caprolactone, 325 parts of mixed epsilon-methyl-epsilon-caprolactone, 29 parts of ethylene glycol and 0.5 parts of dibutyltin oxide at 170° C. for 17 hours under nitrogen. This produces a methyl substituted, unsubstituted copolyester or mixture. Alternatively, a mixture of 600 parts of epsilon-caprolactone, 33.4 parts of hexamethylene diamine and 0.3 parts of dibutyltin oxide can be heated at 170° C. under nitrogen for 24 hours. The products are recovered in known ways.

Further details on preparative procedures for this polyester component may be obtained by reference to The Encyclopedia of Polymer Science and Technology, Vol. 11, John Wiley and Sons, Inc., New York, 1969, pp. 98-101; H. Cherdron et al., Makromol. Chem. 56, 179-186 and 187-194 (1962); U.S. Pat. Nos. 2,933,477 and 2,933,478.

Illustratively, sufficiently high molecular weights for the linear aliphatic polyester resin component (b) will be provided if the reduced viscosity is at least about 0.1 and preferably about 0.3, as measured in benzene at 2 g./l. at 30° C. The upper limit is not critical, but will generally be about 2.0. The preferred polyesters will have from about 100 to about 1000 average repeating units. For poly(epsilon-caprolactone), the most preferred reduced viscosity range will be about 0.3 to 0.7.

However, especially preferred polymers will have about 300 to 400 repeating units in the average chain - for poly(epsilon-caprolactone), the corresponding reduced viscosity will range around 0.65-0.75, in benzene at 30° C.

Although the poly(1,4-butylene terephthalate) and/or copolyester resins and the linear aliphatic polyester resins are combinable with each other in all proportions, because major proportions of the latter cause adverse effects on heat distortions and stiffness, only compositions 99 to 60 parts by weight of the poly(1,4-butylene terephthalate) resin and from 1 to 40 parts by weight of the linear aliphatic polyester resin component are included within the scope of the invention. In general, however, compositions containing from about 75 to about 99, and especially from about 85 to about 99, parts by weight of poly(butylene terephthalate) resin and from about 25 to about 1, and especially from about 15 to about 1, parts by weight of the linear aliphatic polyester resin component exhibit the best overall combination of properties and these concentrations are preferred.

The polyester resins employed herein are preferably crystallizable.

The filler consisting of fibrous glass or a mineral or mixtures thereof employed in the present composition is well known to those skilled in the art. By fibrous glass materials, it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about 1/8" to about 1" long, preferably 3/8" or less in length. These are called chopped strands. Some of these binding agents are polymers such as polyvinyl acetate, particular polyester resins, polycarbonates, starch, acrylic melamine, polyvinyl chloride, polyethylene oxide or polyvinyl alcohol. Also, the filler may be a mineral such as synthetic or naturally occurring silicates. Aluminum silicate, talc, asbestos, Wollastonite, etc. are preferred minerals. A preferred form of the mineral is a finely divided powder. The filler may also comprise mixtures of glass and a mineral. Any suitable method of incorporating the filler with the polyester resin can be used such as blending chopped glass strands with the polyester resin so that glass fibers are uniformly dispersed therein. The polyester resin contains from about 5 to about 50 weight percent of the filler based on the weight of the resin.

The foaming agents of the present invention can be selected from chemicals containing decomposable groups such as azo, N-nitroso, carboxylate, carbonate, heterocyclic nitrogen containing and sulfonyl hydrazide groups. Representative compounds include azodicarbonamide, dinitrosopentamethylene tetramine, p,p'-oxy-bis(benzenesulfonyl)-hydrazide, benzene-1,3-disulfonyl hydrazide, azo-bis-(-isobutyionitrile), biuret and urea. The foaming agent can also consist of normally gaseous agents such as gaseous fluorocarbons as well as gases such as nitrogen, carbon dioxide, air, helium, argon and krypton. Volatile liquids such as pentane, and liquid fluorocarbons may also be employed in the foaming of the polymer. The foaming agent may be added to the polymer in several different ways which are known to those skilled in the art, for example, by adding liquid or gaseous agents directly to the resin in the extruder while the resin is in the molten state to obtain uniform dispersal of the agent in the molten plastic. The temperature and pressures to which the foamable composition of the invention are subjected to provide a foamed polyester will vary within a wide range, depending upon the amount and type of foaming agent that is used. The foaming agents may be used in amounts of from about 0.02 to about 5.0 weight percent and preferably from about 0.02 to about 2.0 weight percent based on the weight of the resin. The preferred foaming agents are dinitrosopentamethylene tetramine, p-toluene sulfonyl semicarbazide, 5-phenyltetrazole, calcium oxalate and trihydrazino-s-triazine.

The polyester resin may be prepared by any of the well known methods outlined above. The filler may be blended with the resin at room temperature. The blend consisting of the polyester resin and the filler is fed into an extruder at a temprature of 480° F. to about 550° F. The extrudate is then comminuted into pellets or other suitable shapes. If a decomposable chemical foaming agent is used, it can be dry tumbled with the resin. This mixture is then fed into a conventional molding machine. The molding temperature may be from about 500° F. to about 580° F. with the mold temperature being from about 100° F. to 250° F., preferably from about 140° F. to about 200° F.

If the foaming agent is a liquid or gaseous agent, it may be added directly to the molten resin to obtain uniform dispersal of the agent in the molten resin and thereafter may be injected into a mold to produce a foam molded product.

The foamable composition may be handled in any conventional manner employed for the fabrication or manipulation of polyesters such as low and high pressure injection molding to provide polyester products which have uniform cell structure, smooth surfaces, high impact, modulus and tensile strength, improved flow and cycle time.

The composition may contain additional materials such as pigments and dyes, stabilizers, plasticizers, antioxidants, mold-release agents, ultraviolet stabilizers, and the like.

DESCRIPTION OF THE PREFERRED EMBODIMENT

The following Examples are set forth herein to illustrate in more detail the preferred embodiments and to illustrate more clearly the principle and practice of this invention to those skilled in the art. Unless otherwise specified, where parts or percents are mentioned, they are parts or percents by weight.

EXAMPLE 1

Poly(ethylene terephthalate), intrinsic viscosity 0.73 dl./g.; melting point 258° C. is blended at room temperature with 10 parts by weight of chopped glass strands 1/8" long. The blend is fed into an extruder at a temperature of about 490° F. The extrudate is comminuted into pellets. The pellets are dried at 250° F. for about four hours and then tumble blended with 0.2 parts by weight of 5-phenyl-tetrazole foaming agent. This composition is then injection molded at 550° F., in a standard injection molding machine, into ASTM type test bars having a specific gravity of 1.00 (Sample A) and 1.26 (Sample B). The difference in specific gravity is achieved by injecting different amounts of the foamed composition into the mold. The properties obtained are set out in Table I.

The test bars of the Examples are tested for one or more of the following physical properties: tensile strength and elongation, ASTM D-1708; flexural strength and modulus, ASTM D-790; unnotched impact strength; ASTM D-1822; compression strength, ASTM D-1621; and heat distortion temperature, ASTM D-790. The results are set out in the Tables.

TABLE I

| Properties | Sample A | Sample B |
|---|---|---|
| Tensile Strength, psi | 5,850 | 8,590 |
| Elongation, % | 8.2 | 9.7 |
| Flexural Strength, psi | 8,250 | 15,740 |
| Flexural Modulus, psi | 497,000 | 569,000 |
| Compression Strength, psi | 9,120 | 13,880 |
| Unnotched Impact Strength, ft.-lbs./in. | 2.33 | 3.10 |

The poly(ethylene terephthalate) resin of Example 1 is blended at room temperature with 20 parts by weight of chopped glass strands ⅛" long. The blend is extruded, blended with foaming agent and molded by the procedure of Example 1 into ASTM type test bars of specific gravity 1.10 (Sample C) and 1.34 (Sample D). The properties obtained are set out in Table II.

TABLE II

| Properties | Sample C | Sample D |
|---|---|---|
| Tensile Strength, psi | 9,150 | 13,200 |
| Elongation, % | 11.2 | 11.9 |
| Flexural Strength, psi | 14,970 | 21,500 |
| Flexural Modulus, psi | 602,000 | 731,000 |
| Compression Strength, psi | 12,540 | 17,140 |
| Unnotched Impact Strength, ft.-lbs./in. | 5.05 | 6.00 |

EXAMPLE 3

The poly(ethylene terephthalate) resin of Example 1 is blended at room temperature with 30 parts by weight of chopped glass strands ⅛" long. The blend is extruded, blended with foaming agent and molded by the procedure of Example 1 into ASTM type test bars of specific gravity 1.16 (Sample E) and 1.34 (Sample F). The properties obtained are set out in TABLE III.

TABLE III

| Properties | Sample E | Sample F |
|---|---|---|
| Tensile Strength, psi | 11,380 | 15,540 |
| Elongation, % | 11.2 | 12.1 |
| Flexural Strength, psi | 21,620 | 24,350 |
| Flexural Modulus, psi | 948,000 | 1,056,000 |
| Compression Strength, psi | 14,780 | 20,720 |
| Unnotched Impact Strength, ft.-lbs./in. | 6.85 | 9.40 |

EXAMPLE 4

The poly(ethylene terephthalate) resin of Example 1 is blended at room temperature with 30 parts by weight of a mixture of 10 parts by weight of chopped glass strands ⅛" long and 20 parts by weight of Wollastonite. The blend is extruded, blended with foaming agent and molded by the procedure of Example 1 into ASTM type test bars of specific gravity 1.15 (Sample G) and 1.40 (Sample H). The properties obtained are set out in TABLE IV.

TABLE IV

| Properties | Sample G | Sample H |
|---|---|---|
| Tensile Strength, psi | 6,980 | 9,230 |
| Elongation, % | 6.0 | 6.4 |
| Flexural Strength, psi | 9,810 | 14,130 |
| Flexural Modulus, psi | 510,000 | 684,000 |
| Compression Strength, psi | 7,860 | 13,640 |

EXAMPLE 5

The poly(ethylene terephthalate) of Example 1 is blended at room temperature with 30 parts by weight of a mixture of 20 parts by weight of chopped glass strands ⅛" long and 10 parts by weight of Wollastonite. The blend is extruded, blended with foaming agent and molded by the procedure of Example 1 into ASTM type test bars of specific gravity 1.15 (Sample I) and 1.40 (Sample J). The properties are set out in TABLE V.

TABLE V

| Properties | Sample I | Sample J |
|---|---|---|
| Tensile Strength, psi | 8,360 | 11,670 |
| Elongation, % | 7.2 | 8.0 |
| Flexural Strength, psi | 13,740 | 18,270 |
| Flexural Modulus, psi | 640,000 | 880,000 |
| Compression Strength, psi | 12,470 | 18,020 |

EXAMPLE 6

To 70 parts by weight of a blend consisting of 95 parts by weight of poly(1,4-butylene terephthalate) and 5 parts by weight of poly(ethylene terephthalate) is added 30 parts by weight of chopped glass strands ⅛" long. This mixture is fed into an extruder at a temperature of about 490° F. The extrudate is comminuted into pellets. The pellets are dried at 250° F. for about four hours and then tumble blended with 0.2 parts by weight of 5-phenyltetrazole foaming agent. This composition is then injection molded at 550° F., in a standard injection molding machine, into ASTM type test bars having a specific gravity of 1.10 (Sample K) and 1.35 (Sample L). The properties obtained are set forth in TABLE VI.

EXAMPLE 7

Example 4 is repeated with the exception that 10 parts by weight of poly(ethylene terephthalate) is used instead of 5 parts by weight. The properties obtained are set forth in TABLE VI.

EXAMPLE 8

Example 4 is repeated with the exception that 20 parts by weight of poly(ethylene terephthalate) is used instead of 5 parts by weight. The properties obtained are set out in TABLE VI.

EXAMPLE 9

Example 4 is repeated with the exception that 30 parts by weight of poly(ethylene terephthalate) is used instead of 5 parts by weight. The properties obtained are set out in TABLE VI.

TABLE VI

| Sample | Example | | | | | | | |
|---|---|---|---|---|---|---|---|---|
| | K | L | K | L | K | L | K | L |
| Tensile Strength, psi | 10,560 | 15,310 | 10,240 | 14,350 | 10,580 | 14,410 | 10,940 | 14,750 |
| Elongation, % | 8.0 | 8.8 | 8.3 | 8.5 | 7.8 | 8.3 | 7.9 | 8.7 |
| Flexural Strength, psi | 16,370 | 22,300 | 16,820 | 22,910 | 16,280 | 22,230 | 16,940 | 22,000 |
| Flexural Modulus, psi | 786,000 | 968,000 | 775,000 | 954,000 | 723,000 | 960,000 | 770,000 | 968,000 |
| Compression Strength, psi | 12,840 | 18,400 | 13,250 | 16,480 | 12,800 | 18,320 | 12,000 | 18,400 |
| Unnotched Impact Strength, ft.-lbs./in. | 5.92 | 10.10 | 8.33 | 9.75 | 8.30 | 9.25 | 9.05 | 12.00 |
| Heat Distortion Temp., °F., at 264 psi(⅛″) | 376 | 391 | 360 | 385 | 357 | 380 | 348 | 372 |

EXAMPLE 10

Equal amounts of poly(1,4-butylene terephthalate), intrinsic viscosity, 1.15 dl./g. and poly(epsilon-caprolactone), intrinsic viscosity, about 0.7 dl./g., molecular weight about 40,000 are blended with 10 parts by weight of chopped glass strands ⅛″ long. The blend is fed into an extruder at a temperature of about 490° F. The extrudate is comminuted into pellets. The pellets are dried at 250° F. for about four hours and then tumble blended with 0.2 parts by weight of 5-phenyl-tetrazole foaming agent. This composition is then injection molded at 550° F., in a standard injection molding machine into ASTM type test bars. The properties tested were those in TABLE VI. The values for these properties were about the same as those in TABLE VI.

EXAMPLE 11

The poly(ethylene terephthalate) resin of Example 1 is blended at room temperature with 5 parts by weight of chopped glass strands ⅛″ long. The blend is extruded, blended with foaming agent and molded by the procedure of Example 1 into ASTM type test bars of specific gravity 1.00 (Sample K) and 1.25 (Sample L). The properties obtained are set out in TABLE VII.

TABLE VII

| Properties | Sample | |
|---|---|---|
| | K | L |
| Tensile Strength, psi | 3,495 | 4,125 |
| Elongation, % | 5.7 | 6.0 |
| Flexural Strength, psi | 6,940 | 12,610 |
| Flexural Modulus, psi | 338,000 | 402,000 |
| Compression Strength, psi | 6,520 | 9,600 |
| Unnotched Impact Strength, ft.-lbs./in. | 2.03 | 2.57 |

EXAMPLE 12

The poly(ethylene terephthalate) of Example 1 is fed into an extruder and the extrudate comminuted into pellets. The pellets were dried at 250° F. for about four hours and then tumble blended with 0.2 parts by weight of 5-phenyltetrazole foaming agent. This composition is then injection molded at 550° F., in a standard injection molding machine. The procedure of this Example was repeated and only the injection molding temperature was changed. The foam is unevenly distributed throughout the test piece. The test pieces are badly warped and irregularly foamed with large voids and sink marks so that meaningful and consistent test data were impossible to obtain. Also, it was not possible to foam the specimen over a range of specific gravity.

EXAMPLE 13

The blends of poly(1,4-butylene terephthalate) and poly(ethylene terephthalate) of Examples 6 through 9 are fed into an extruder and the extrudate comminuted into pellets. The pellets were dried, blended with foaming agent and injection molded as in Example 12. The results were the same as in Example 12.

EXAMPLE 14

The blend of poly(1,4-butylene terephthalate) and poly(epsilon caprolactone) of Example 10 is fed into an extruder and the extrudate comminuted into pellets. The pellets were dried, blended with foaming agent and injection molded as in Example 12. The results were the same as in Example 12.

As seen in Examples 12 and 14, foaming agent added to resin alone does not produce an acceptable foamed product. The test pieces are badly warped and irregularly foamed with large voids and sink marks so that meaningful and consistent test data were impossible to obtain. However, the composition of the present invention, as seen in Examples 1 through 11, and TABLE I through TABLE VII, produces a foamed product exhibiting high tensile strength, flexural strength, flexural modulus, compression strength and impact strength. Additionally, products produced from the instant composition exhibit greater rigidity than unfoamed products of the same weight. The combination of these mechanical properties with rigidity provides high strength-to-weight ratios than metal.

Obviously, other modifications and variations of the present invention are possible in the light of the above teachings. It is, therefore, to be understood that changes may be made in the particular embodiments of this invention described which are within the full intended scope of the invention as defined by the appended claims.

What is claimed is:

1. A foamable thermoplastic injection moldable composition consisting essentially of an admixture of:
   (a) a polyester resin selected from the group consisting of (1) a poly(ethylene terephthalate) resin or a copolyester thereof, (2) a combination of a poly(ethylene terephthalate) resin and a poly(1,4-butylene terephthalate) resin or copolyesters thereof and (3) a combination of a poly(1,4-butylene terephthalate) resin or a copolyester thereof and a linear aliphatic polyester resin;
   (b) a filler selected from the group consisting of fibrous glass or a mineral or mixtures thereof in an amount of from about 5 to about 50 weight percent; and (c) a minor amount of a foaming agent selected from the group consisting of dinitrosopentamethylene tetramine, p-toluene sulfonyl semicarbazide, 5-phenyltetrazole, calcium oxalate and trihydrazino-s-triazine said amount being sufficient to provide a rigid cellular core within a solid integral skin.

2. A foamable thermoplastic injection moldable composition according to claim 1 in which the foaming agent is present in an amount of from about 0.02 to about 2.0 weight percent, said weight percent being based on the total weight of resin.

3. The composition of claim 2 wherein the polyester resin combination (2) comprises
   (a) from about 1 to about 99 parts by weight of a poly(ethylene terephthalate) resin and
   (b) from about 99 to about 1 part by weight of a poly(1,4-butylene terephthalate) resin or a copolyester thereof with a minor amount of an aliphatic or aromatic dicarboxylic acid or an aliphatic polyol.

4. A composition as defined in claim 3 wherein component (b) is a poly(1,4-butylene terephthalate) resin.

5. The composition of claim 2 wherein the polyester resin combination (3) comprises
   (a) from about 99 to about 60 parts by weight of a poly(1,4-butylene terephthalate) resin or a copolyester thereof with a minor amount of an aliphatic or aromatic dicarboxylic acid or an aliphatic polyol and
   (b) from about 1 to about 40 parts by weight of a linear aliphatic polyester resin.

6. The composition as defined in claim 5 wherein component (a) is a poly(1,4-butylene terephthalate) resin.

7. The composition as defined in claim 5 wherein linear aliphatic polyester resin component (b) is poly(-beta-propiolactone), poly(gamma-butyrolactone), poly(delta-valerolactone), poly-(epsilon-caprolactone) or a mixture of at least two of the foregoing.

8. A composition as defined in claim 1 wherein linear aliphatic resin component (b) is poly(epsilon-caprolactone).

9. The composition of claim 2 wherein the fibrous glass filler comprises finely divided fibrous glass filaments.

10. The composition of claim 9 wherein the fibrous glass filler consists of finely divided glass filaments treated with a binding agent.

11. The composition of claim 2 wherein the mineral filler is talc.

12. The composition of claim 2 wherein the mineral filler is asbestos.

13. The composition of claim 2 wherein the mineral filler is Wollastonite.

* * * * *